(12) United States Patent
Kobilansky

(10) Patent No.: US 7,092,549 B2
(45) Date of Patent: Aug. 15, 2006

(54) METHOD AND APPARATUS FOR REMOVING DEFECTS IN AN IMAGE SEQUENCE

(75) Inventor: Alexander Kobilansky, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 858 days.

(21) Appl. No.: 09/838,010

(22) Filed: Apr. 19, 2001

(65) Prior Publication Data

US 2002/0154827 A1    Oct. 24, 2002

(51) Int. Cl.
*G06K 9/00* (2006.01)

(52) U.S. Cl. .................. 382/107; 382/254; 382/275

(58) Field of Classification Search ........... 382/254, 382/274, 275, 252, 236, 149; 348/407.1, 348/415.1, 416.1; 345/700
See application file for complete search history.

(56) References Cited

U.S. PATENT DOCUMENTS

| | | | | |
|---|---|---|---|---|
| 5,574,640 A | * | 11/1996 | Sycara et al. ............... 700/99 |
| 5,627,918 A | * | 5/1997 | Carasso ..................... 382/254 |
| 5,874,988 A | * | 2/1999 | Gu .............................. 348/97 |
| 6,046,773 A | * | 4/2000 | Martens et al. ......... 375/240.25 |
| 6,167,150 A | * | 12/2000 | Michael et al. ............ 382/149 |
| 6,345,257 B1 | * | 2/2002 | Jarrett .......................... 705/1 |

FOREIGN PATENT DOCUMENTS

WO    WO9914950    3/1999

* cited by examiner

*Primary Examiner*—Yon J. Couso
(74) *Attorney, Agent, or Firm*—Larry Liberchuk

(57) ABSTRACT

A method and apparatus are disclosed for detecting and removing defects from images. Defects in an original image sequence are detected and optionally repaired using well-known techniques. Non-image data is generated containing intermediate results from the automatic defect detection and repair stage. The non-image data may include motion estimation, granularity and defect size/location information. The invention allows the operator to review the original and repaired image sequences, and optionally the non-image data, in an interactive session to accept, reject or further modify any of the automatic repairs in a more efficient manner.

20 Claims, 6 Drawing Sheets

METHOD AND APPARATUS FOR REMOVING DEFECTS IN AN IMAGE SEQUENCE

FIELD OF THE INVENTION

The present invention relates to digital image restoration techniques, and more particularly, to a method and apparatus for removing defects from images.

BACKGROUND OF THE INVENTION

Digital motion picture restoration involves a variety of image processing operations that require a considerable amount of computations and take a relatively long amount of time, even with powerful computers. An example of a computation-intensive image processing technique is motion estimation, which is required for high fidelity repair. Generally, motion estimation allows a defective region of an image to be replaced with a corresponding image region from a previous or subsequent image frame.

Longer processing times are acceptable if the computations are conducted automatically, without user interaction. Numerous complex algorithms have been developed for automatic image sequence restoration. For a detailed discussion of such image restoration techniques, see, for example, Anil Kokaram, "Motion Picture Restoration," (Springer, 1998). Currently available image restoration techniques, however, do not provide a complete solution. Generally, currently available image restoration techniques suffer from incomplete repair or false detection (or both), resulting in image artifacts. Thus, human intervention is eventually required to complete the image restoration and obtain high quality artifact-free restoration.

FIG. 1 illustrates a conventional one-step image restoration process 100, where an operator 110 works with an unprocessed, original image sequence 120 to produce a repaired image sequence 140. The image restoration process shown in FIG. 1 has been proposed, for example, for use in the image restoration software and services offered by Mathematical Technologies, Inc. of Providence, R.I. Generally, the operations performed during an interactive session 130 are conducted under the supervision of the operator 110 who manually identifies defects in the original image sequence 120. Thus, the image restoration process 100 does not make efficient use of expensive operator time. Once defects are identified by the operator in this manner, well-known restoration algorithms are typically applied during the interactive session 130 to generate the repaired image sequence 140.

FIG. 2 illustrates a partially automated image restoration process 200. As shown in FIG. 2, the operator 210 initially specifies parameters 215 that control the automatic detection and repair of defects in the original image sequence 220 during an automatic repair stage 230. The operator 210 can review the repaired image sequence 240 generated by the automatic repair stage 230 together with the original image sequence 220, and accept, reject or modify any of the automatic repairs during an interactive session 250 to produce a repaired image sequence 260. An example of the partially automated image restoration process 200 shown in FIG. 2 is the Revival™ software package commercially available from da Vinci Systems, Inc. of Fort Lauderdale, Fla.

While the partially automated image restoration process 200 automatically detects and repairs images without human interaction in a more efficient manner than the one-step image restoration process 100 of FIG. 1, the operator 210 still has very limited abilities to mark and repair additional defects that are not automatically detected during the automatic repair 230. Thus, it is difficult for the operator 210 to achieve a high quality image restoration during the interactive session 250 because the intermediate results from the automatic repair processing 230, such as motion estimation and granularity information, are not available. A need therefore exists for a method and apparatus for removing defects from images that improve the quality of the image repair while also making efficient use of the operator's time.

SUMMARY OF THE INVENTION

Generally, a method and apparatus are disclosed for detecting and removing defects from images to more efficiently generate repaired images with improved repair quality. An original image sequence is initially processed using conventional techniques to automatically identify and optionally repair defects. The present invention extends the conventional image processing techniques by generating non-image data containing intermediate results from the automatic detection and repair of defects. In this manner, the non-image data may be employed in a subsequent interactive session to more efficiently repair defects identified by a user.

The non-image data includes, for example, the motion estimation, granularity and defect size/location information that was utilized by the conventional techniques to initially identify any defects. The present invention allows the operator to review the original and repaired image sequences, and optionally the non-image data, in an interactive session to accept, reject or further modify any of the automatic repairs in a more efficient manner. Once defects are identified by a user during an interactive session, the non-image data can be employed to more efficiently identify a replacement sub-image for the identified defective region.

A more complete understanding of the present invention, as well as further features and advantages of the present invention, will be obtained by reference to the following detailed description and drawings.

DETAILED DESCRIPTION

Figure 1:
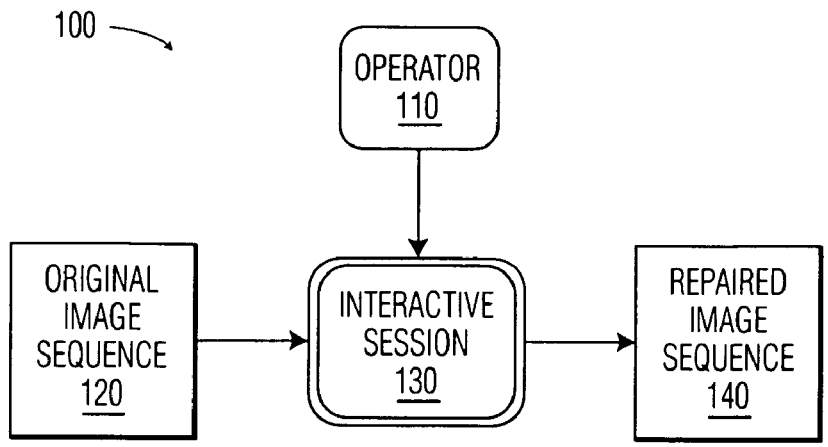
FIG. 1 is a flow chart describing a conventional one-step image restoration process.
Figure 2:
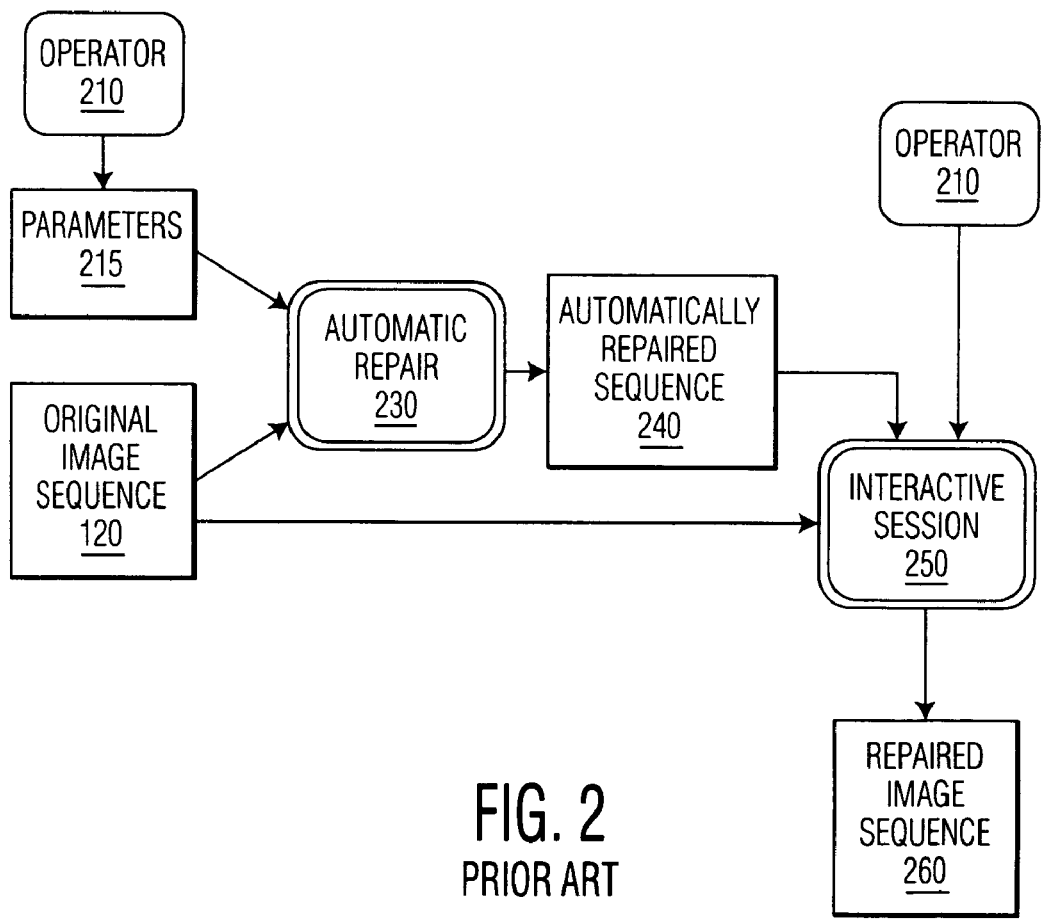
FIG. 2 is a flow chart describing a conventional partially automated image restoration process.
Figure 3:
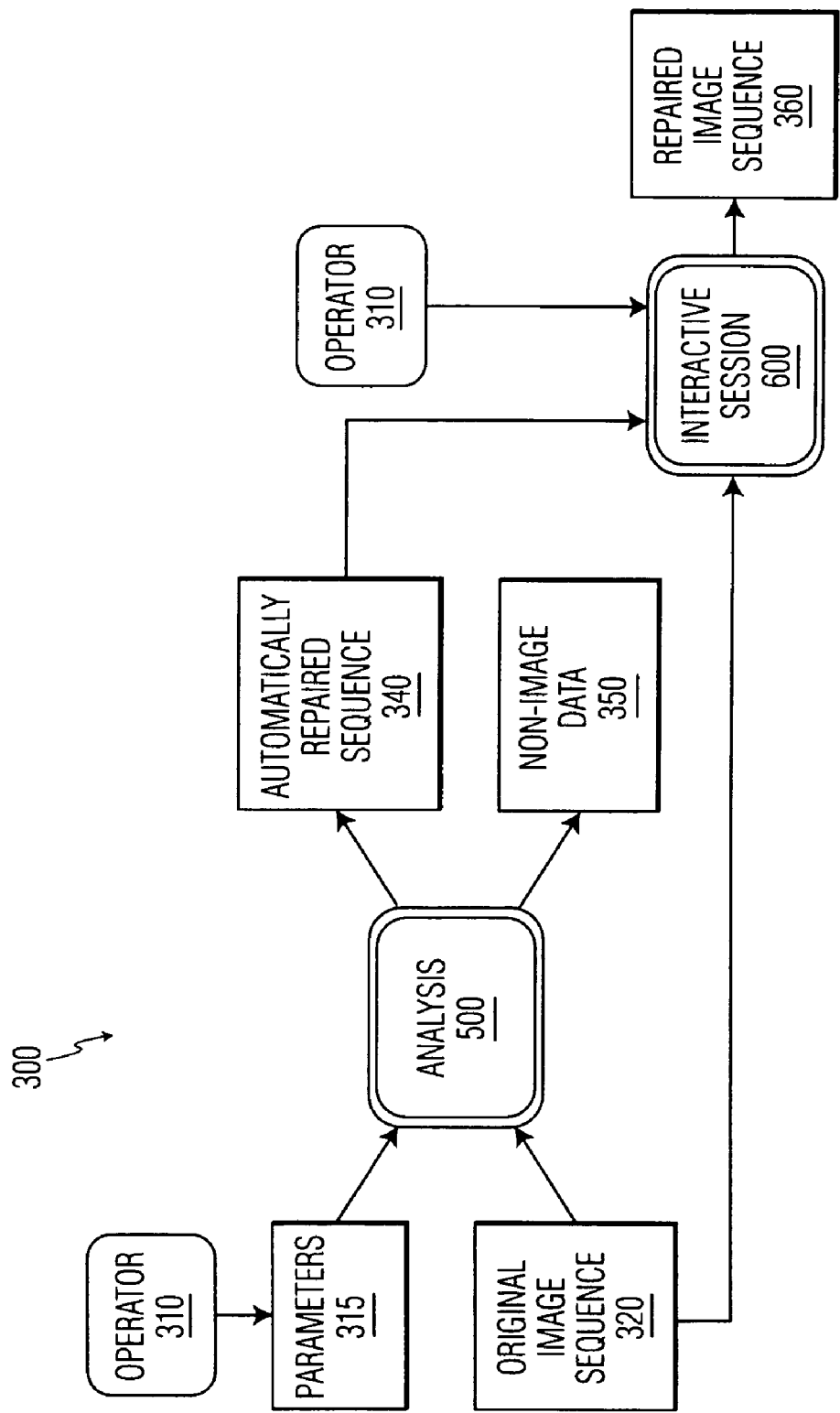
FIG. 3 is a flow chart describing an image restoration process in accordance with the present invention.

FIG. 3 illustrates an image restoration process 300 in accordance with the present invention. As shown in FIG. 3, the operator 310 can optionally specify parameters 315 that control the automatic detection and repair of defects in the original image sequence 320 in a similar manner to the partially automated image restoration process shown in FIG.

2. The parameters 315 may be specified by the user or default values may be employed. The parameters 315 may include, e.g., variables for thresholds, smoothness and precision. The original image sequence 320 is processed during an analysis stage 500, discussed below in conjunction with FIGS. 5A and 5B, that automatically identifies and repairs defects in a well-known manner to generate an automatically repaired image sequence 340.

According to a feature of the present invention, the analysis stage 500 also generates non-image data 350 containing intermediate results from the automatic detection and repair of defects during step 500. The non-image data 350 includes, for example, the motion estimation and granularity information utilized to repair any defects. In this manner, the operator 310 can review the repaired image sequence 340, as well as the non-image data 350, together with the original image sequence 320, in an interactive session 600, discussed below in conjunction with FIG. 6, to accept, reject or modify any of the automatic repairs. As discussed more fully below, the non-image data 350 allows the operator 310 to control the interactive session 600 in a more efficient manner to produce a repaired image sequence 360.

Figure 4:
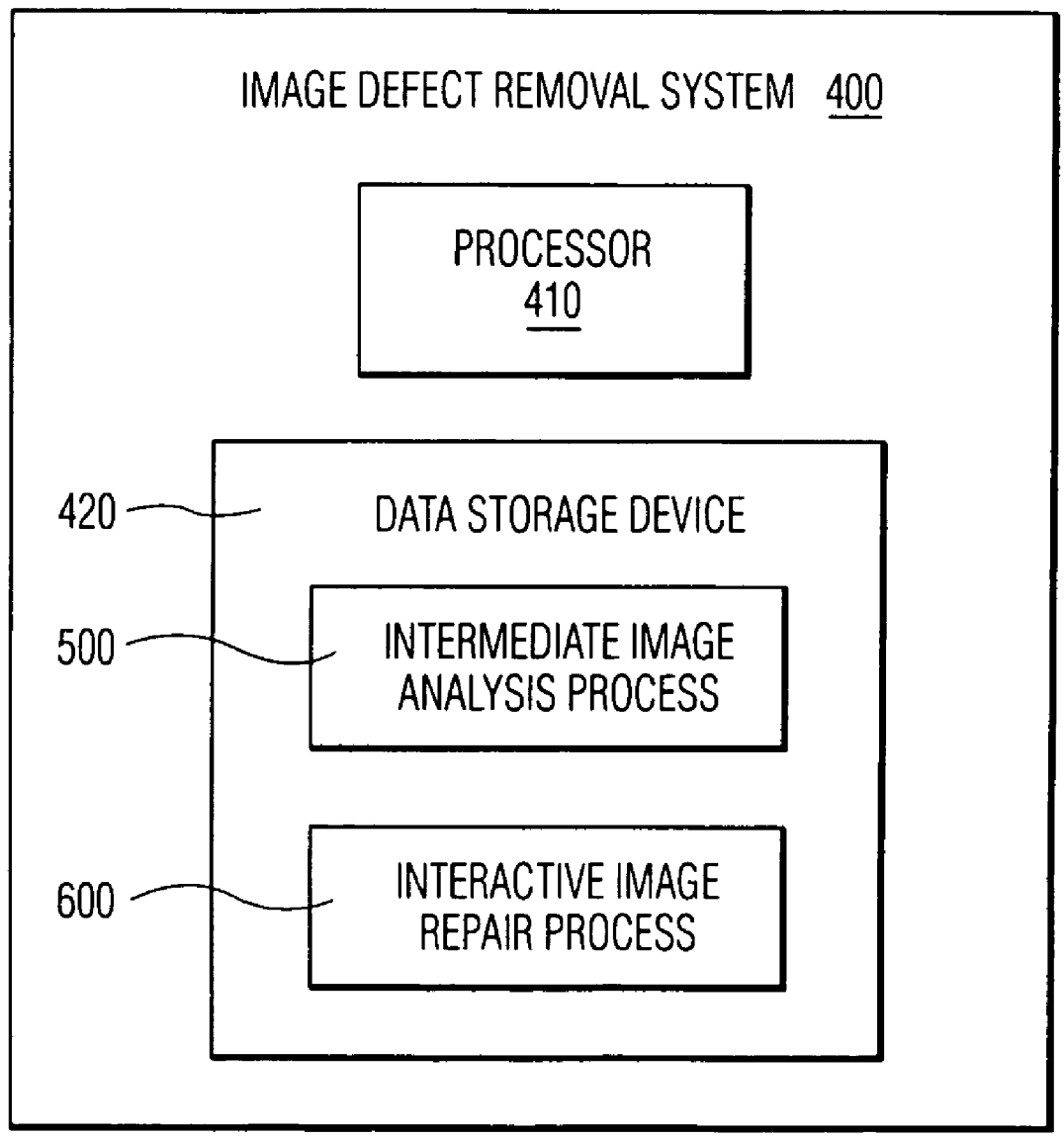
FIG. 4 illustrates an image defect removal system in accordance with the present invention.

FIG. 4 illustrates an image defect removal system 400 in accordance with the present invention. As shown in FIG. 4, the image defect removal system 400 includes certain standard hardware components, such as a processor 410 and a data storage device 420, such as a read-only memory and/or a random access memory (RAM).

The data storage device 420 includes an intermediate image analysis process 500 and an interactive image repair process 600, discussed further below in conjunction with FIGS. 5 and 6, respectively. Generally, the intermediate image analysis process 500 identifies and optionally repairs defects to generate an automatically repaired image sequence 340 and the non-image data 350 containing the intermediate results. The interactive image repair process 600 allows the operator to review the repaired image sequence 340 and original image sequence 320, as well as the non-image data 350 created by the intermediate image analysis process 500. The operator can mark certain areas of an image as defective and request further repair using the non-image data 350 in accordance with the present invention.

The methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Data storage device 420 will configure the processor 410 to implement the methods, steps, and functions disclosed herein. The data storage device 420 could be distributed or local and the processor 410 could be distributed or singular. The data storage device 420 could be implemented as an electrical, magnetic or optical memory, or any combination of these or other types of storage devices. It should be noted that, although data storage device 420 is shown separately from other elements of the image defect removal system 400, this is not necessarily the case for all applications. Moreover, the term "memory" or "data storage device" should be construed broadly enough to encompass any information able to be read from or written to an address in the addressable space accessed by processor 410. With this definition, information on a network is still within data storage device 420 of the image defect removal system 400 because the processor 410 can retrieve the information from the network. In a further variation, the image defect removal system 400 may be embodied as an application specific integrated circuit (ASIC) that may be incorporated, for example, in a workstation or other image processing device.

Figure 5A:
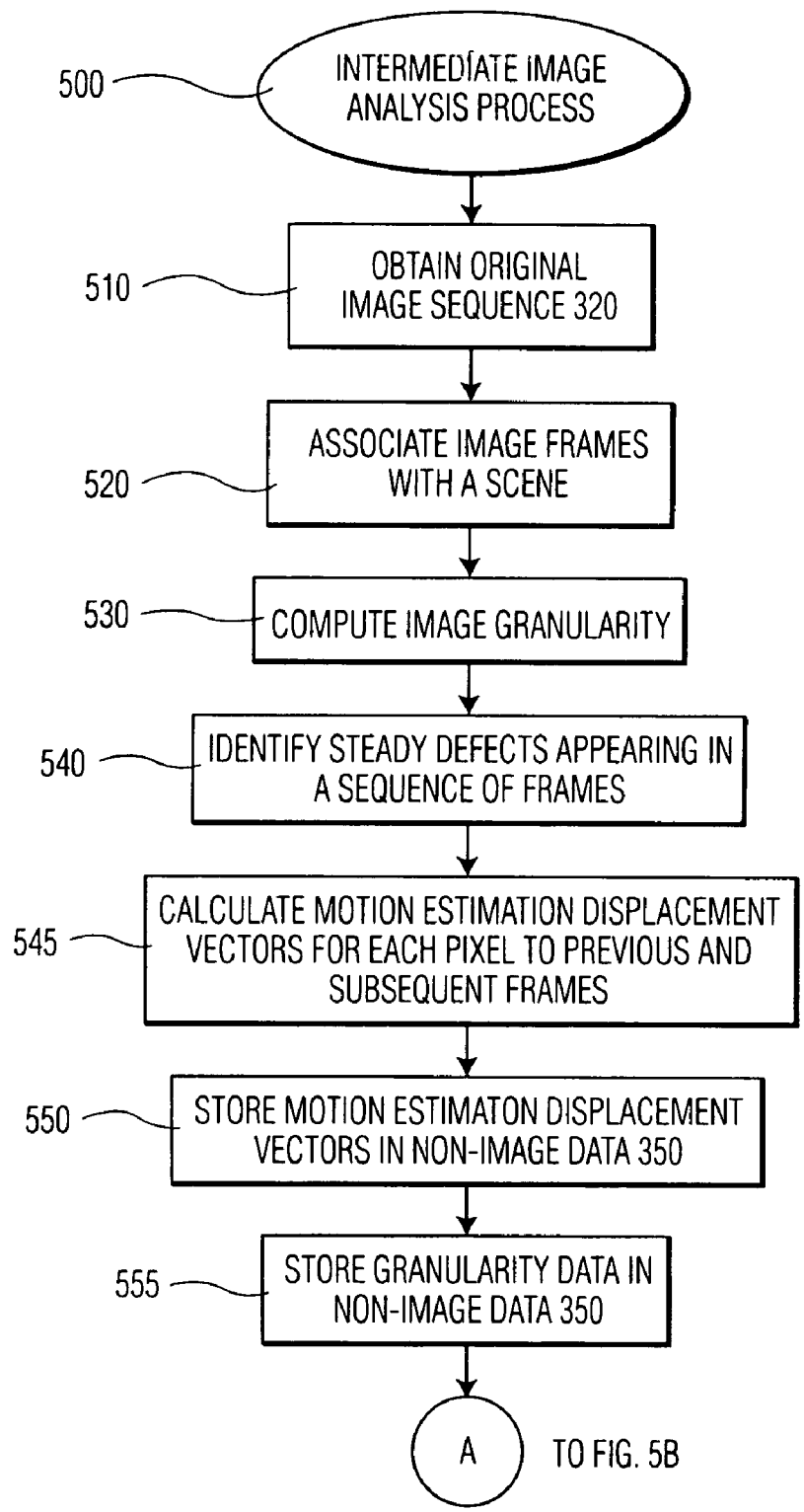
FIGS. 5A and 5B, collectively, are a flow chart describing an exemplary intermediate image analysis process embodying principles of the present invention.
Figure 5B:
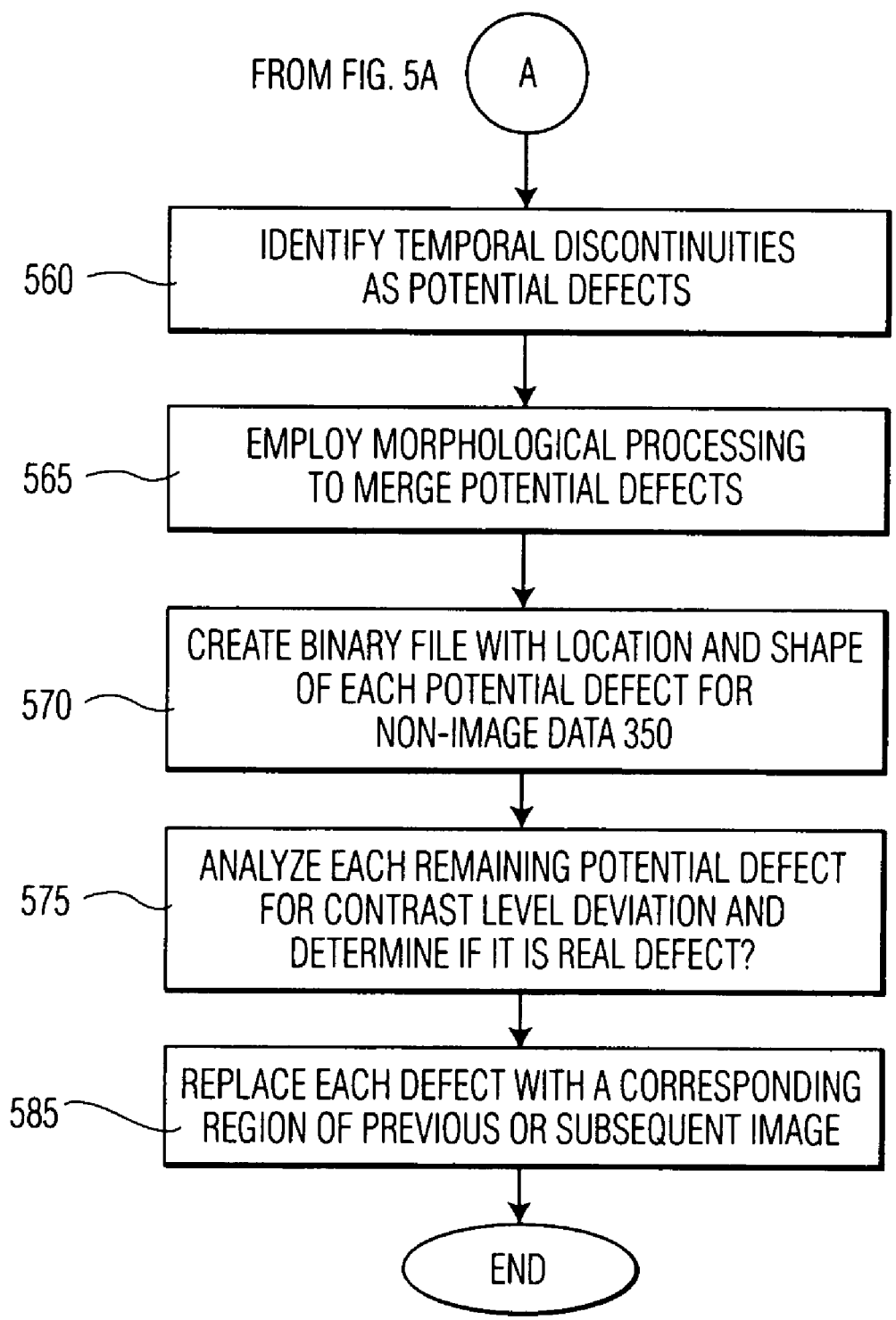

FIGS. 5A and 5B, collectively, are a flow chart describing an exemplary intermediate image analysis process 500 embodying principles of the present invention. As previously indicated, the intermediate image analysis process 500 identifies and optionally repairs defects to generate an automatically repaired image sequence 340 and also generates the non-image data 350 containing the intermediate results. As shown in FIG. 5, the intermediate image analysis process 500 initially obtains the original image sequence 320 during step 510. Thereafter, the intermediate image analysis process 500 associates each image frame with a given scene during step 520. The image granularity is computed during step 530.

Steady defects in a sequence of images, such as vertical scratches, are identified during step 540. Steady defects are those defects that are identified without the aid of motion estimation information. For a detailed discussion of suitable defect detection techniques, see, for example, Anil Kokaram, "Motion Picture Restoration," (Springer, 1998), incorporated by reference herein. Thereafter, motion estimation displacement vectors are computed during step 545 for each pixel (or group of pixels) to previous and subsequent frames. The computed motion estimation displacement vectors are stored in the non-image data file 350 during step 550 and the image granularity data from step 530 is stored in the non-image data file 350 during step 555.

Any temporal discontinuities not explained by the motion vectors are identified as potential defects during step 560 (FIG. 5B). Morphological processing techniques are employed during step 565 to merge potential defects. A binary file is created during step 570 as part of the non-image data 350 indicating the location and shape of each potential defect.

Each remaining potential defect is analyzed during step 575 for contrast level deviation, e.g., relative to a simple interpolation, to determine if it is a real defect. For each real defect identified during step 575, the defect is replaced during step 585 with a corresponding region of a previous or subsequent image using the motion estimation information. For a detailed discussion of suitable defect repair techniques, see, for example, Anil Kokaram, "Motion Picture Restoration," (Springer, 1998), incorporated by reference herein. Thereafter, program control terminates.

Figure 6:
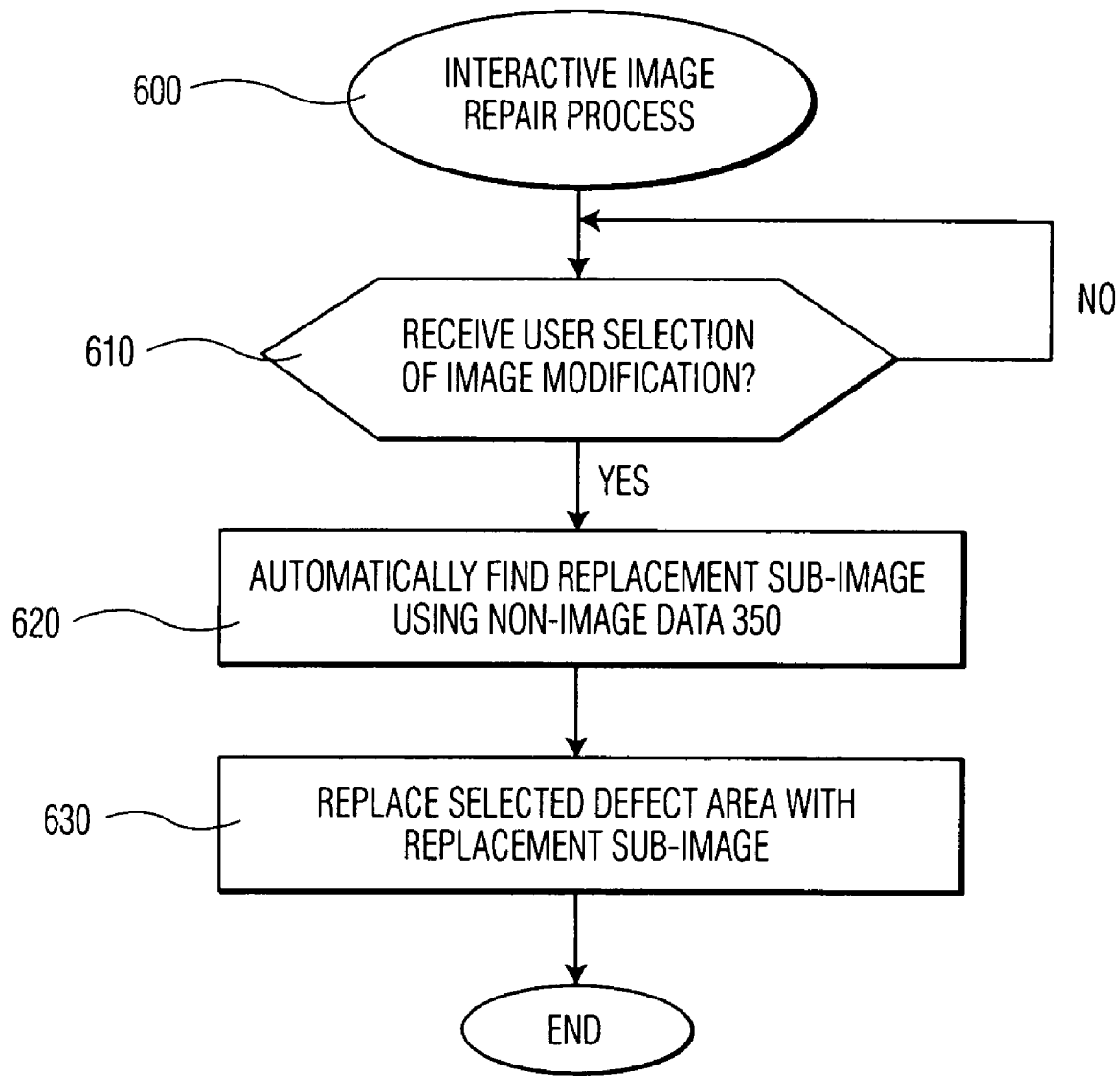
FIG. 6 is a flow chart describing an exemplary interactive image repair process embodying principles of the present invention.

FIG. 6 is a flow chart describing an exemplary interactive image repair process 600 embodying principles of the present invention. As previously indicated, the interactive image repair process 600 allows the operator to mark certain areas of an image as defective and request further repair or modification using the non-image data 350 in accordance with the present invention. As shown in FIG. 6, the interactive image repair process 600 initially receives a user selection during step 610 of an image area for further modification and an indication of the type of modification to be performed, such as a general repair.

Thereafter, the interactive image repair process 600 identifies a replacement image for the user selected defect area during step 620, using, e.g., the granularity or motion estimation information (or both) from the non-image data 350. The user selected defect area is replaced during step 630 with the automatically identified replacement sub-image during step 630, before program control terminates (or returns to step 610 to wait for another user input).

It is to be understood that the embodiments and variations shown and described herein are merely illustrative of the principles of this invention and that various modifications may be implemented by those skilled in the art without departing from the scope and spirit of the invention.

What is claimed is:

1. A machine-effected method for detecting a defect in an image, comprising the machine-effected steps of: detecting a defect in said image; generating non-image data indicating properties of said image; and providing, responsive to a user request, said non-image data to an interactive session to repair said image.

2. The method of claim 1, wherein said non-image data is employed to repair said defect in said interactive session.

3. The method of claim 1, wherein said non-image data includes motion estimation information for a sequence of images.

4. The method of claim 1, wherein said non-image data includes image granularity information.

5. The method of claim 1, wherein said non-image data includes an indication of a location and size of said defect.

6. A machine-effected method for repairing a defect in an image, comprising the machine-effected steps of: receiving a user identification of said defect; evaluating non-image data associated with said image indicating properties of said image that may be utilized to repair said defect; and repairing said defect using said indicated properties of said image.

7. The method of claim 6, wherein said non-image data includes motion estimation information for a sequence of images.

8. The method of claim 6, wherein said non-image data includes image granularity information.

9. The method of claim 6, wherein said non-image data includes an indication of a location and size of said defect.

10. The method of claim 6, further comprising the step of analyzing said non-image data to determine an appropriate method for repairing said defect.

11. A system for detecting a defect in an image, comprising: a memory that stores computer-readable code; and a processor operatively coupled to said memory, said processor configured to implement said computer-readable code, said computer-readable code configured to: detect a defect in said image; generate non-image data indicating properties of said image; and provide, responsive to a user request, said non-image data to an interactive session to repair said image.

12. The system of claim 11, wherein said processor is further configured to repair said defect.

13. The system of claim 11, wherein said processor is further configured to employ said non-image data to repair said defect in an interactive session.

14. The system of claim 11, wherein said non-image data includes motion estimation information for a sequence of images.

15. The system of claim 11, wherein said non-image data includes image granularity information.

16. The system of claim 11, wherein said non-image data includes an indication of a location and size of said defect.

17. A system for repairing a defect in an image, comprising: a memory that stores computer-readable code; and a processor operatively coupled to said memory, said processor configured to implement said computer-readable code, said computer-readable code configured to: receive a user identification of said defect; evaluate non-image data associated with said image, said non-image data indicating properties of said image that may be utilized to repair said defect; and repair said defect using said indicated properties of said image.

18. An article of manufacture for detecting a defect in an image, comprising: a computer readable medium having computer readable code means embodied thereon, said computer readable program code means comprising: a step to detect a defect in said image; a step to generate non-image data indicating properties of said image; a step to provide, responsive to a user request, said non-image data to an interactive session to repair said defect.

19. An article of manufacture for repairing a defect in an image, comprising: a computer readable medium having computer readable code means embodied thereon, said computer readable program code means comprising: a step to receive a user identification of said defect; a step to provide non-image data associated with said image, said non-image data indicating properties of said image that may be utilized to repair said defect; and a step to repair said defect using said indicated properties of said image.

20. The article of manufacture of claim 18, further including, complementary to the providing step, the step of providing, to repair said defect and to said interactive session, a version of said image automatically repaired without user intervention.

* * * * *